United States Patent [19]
Cheng

[11] Patent Number: 5,878,176
[45] Date of Patent: Mar. 2, 1999

[54] OPTICAL CIRCULATOR

[76] Inventor: Yihao Cheng, 36 Meadowbreeze Drive, Kanata, Ontario, Canada, K2M 2L6

[21] Appl. No.: 917,102

[22] Filed: Aug. 25, 1997

Related U.S. Application Data

[63] Continuation of Ser. No. 685,619, Jul. 24, 1996, abandoned.

[60] Provisional application No. 60/001,556 filed Jul. 27, 1995.

[51] Int. Cl.$^6$ ....................................................... G02B 6/00
[52] U.S. Cl. ............................................. 385/11; 385/141
[58] Field of Search ............................... 359/29, 559, 561, 359/17, 18, 197, 901, 508, 569, 485; 356/353, 354; 372/26, 33, 105, 106; 250/235; 385/11, 141

[56] References Cited

U.S. PATENT DOCUMENTS

| | | | |
|---|---|---|---|
| 4,653,921 | 3/1987 | Kwon | 356/353 |
| 4,661,699 | 4/1987 | Welmers et al. | 250/235 |
| 4,786,126 | 11/1988 | Kramer | 350/3.71 |
| 5,097,351 | 3/1992 | Kramer | 359/17 |
| 5,155,606 | 10/1992 | Landesman | 359/29 |
| 5,204,771 | 4/1993 | Koga | 359/281 |
| 5,471,340 | 11/1995 | Cheng et al. | 359/281 |

*Primary Examiner*—Akm E. Ullah
*Attorney, Agent, or Firm*—Neil Teitelbaum & Associates

[57] ABSTRACT

A multi-port optical circulator for transmitting light from incoming and outgoing ports circularly includes one or more birefringent crystal plates disposed adjacent to one another for dividing an input beam into two beams having orthogonal polarizations and for combining two beams having orthogonal polarizations into a singe beam. Polarization beam splitting cubes introduce a beam to an opposite direction depending on the direction of the polarization of the beam and thereby substantially reflecting only one of s and p-polarizations of the beam. A polarization rotator between the first dividing and combining birefringent crystal and said polarization dependent beam splitting cube makes two orthogonal polarization vectors parallel or the two parallel polarization vectors orthogonal to one another.

11 Claims, 10 Drawing Sheets

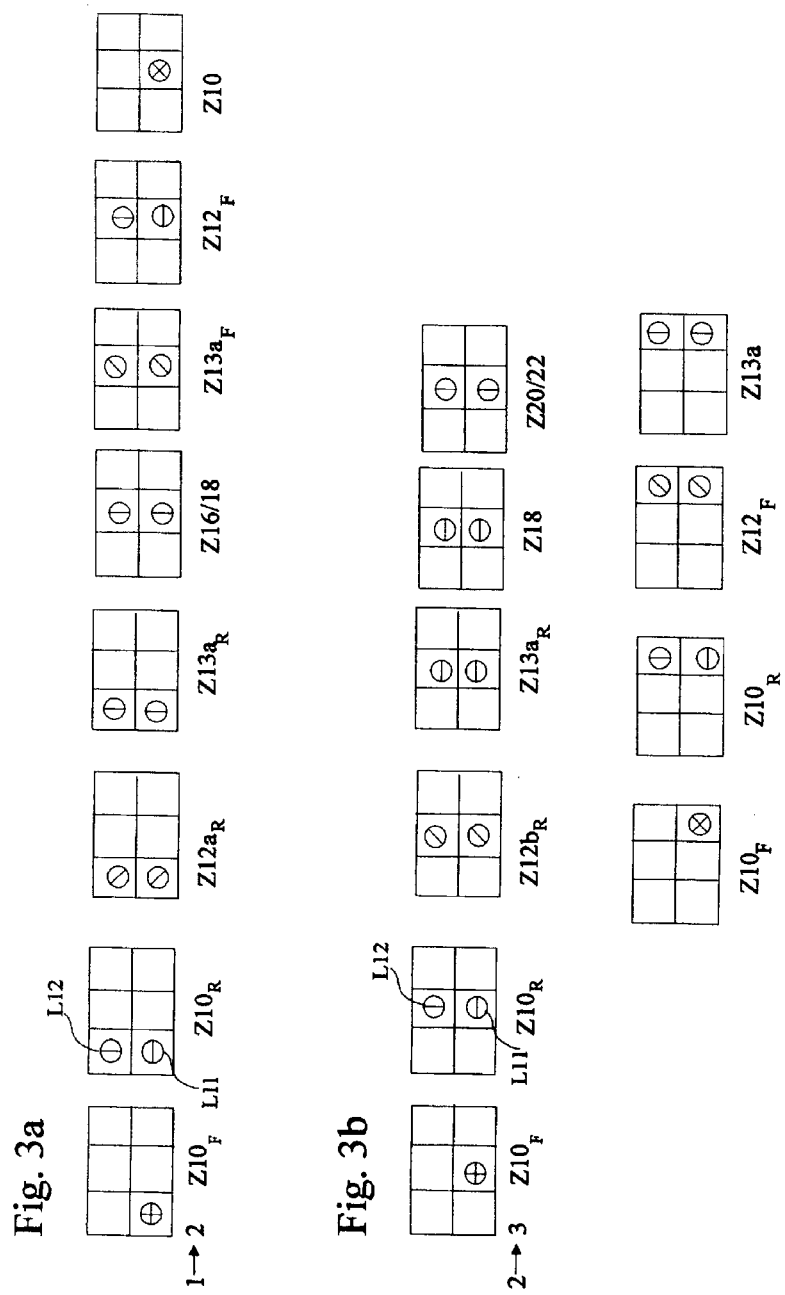

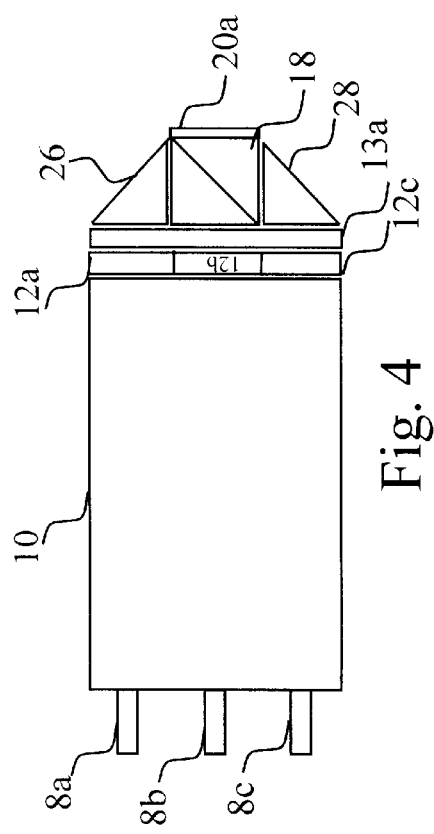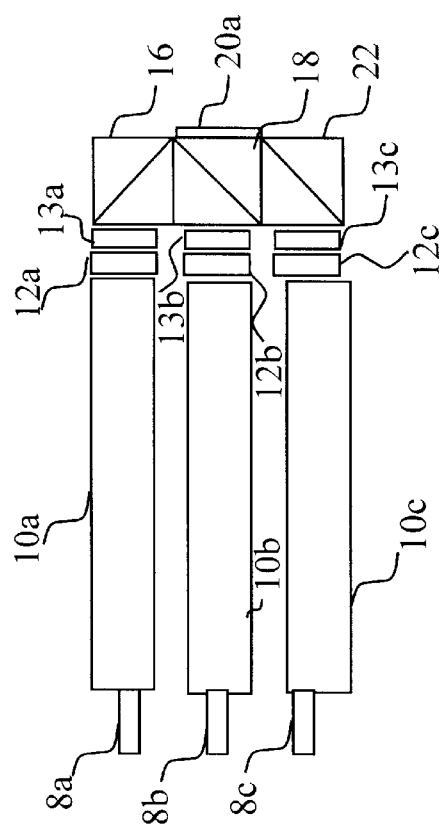

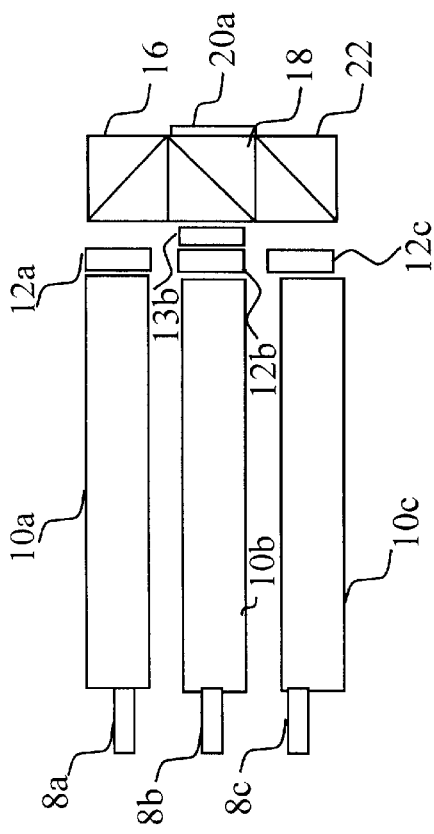
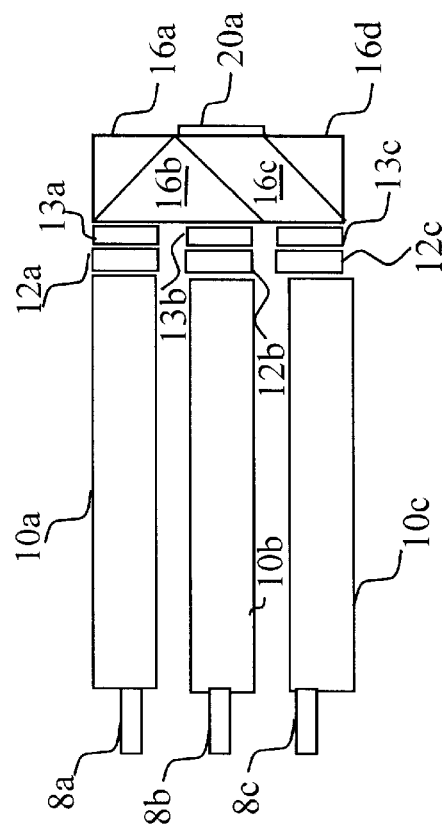
Fig. 5a
Fig. 5b

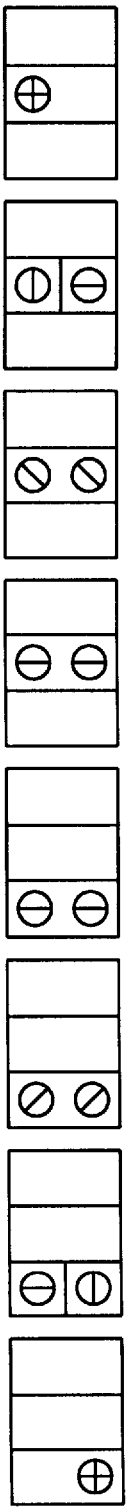
Fig. 5c    1 to 2
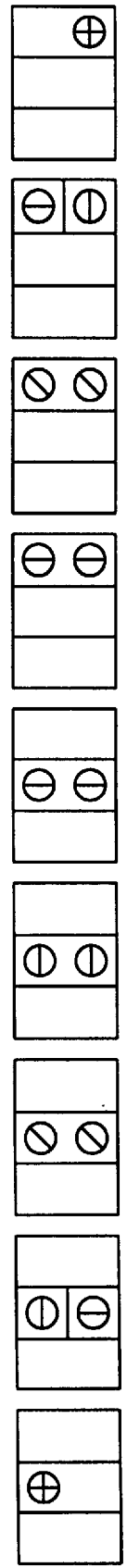
Fig. 5d    2 to 3

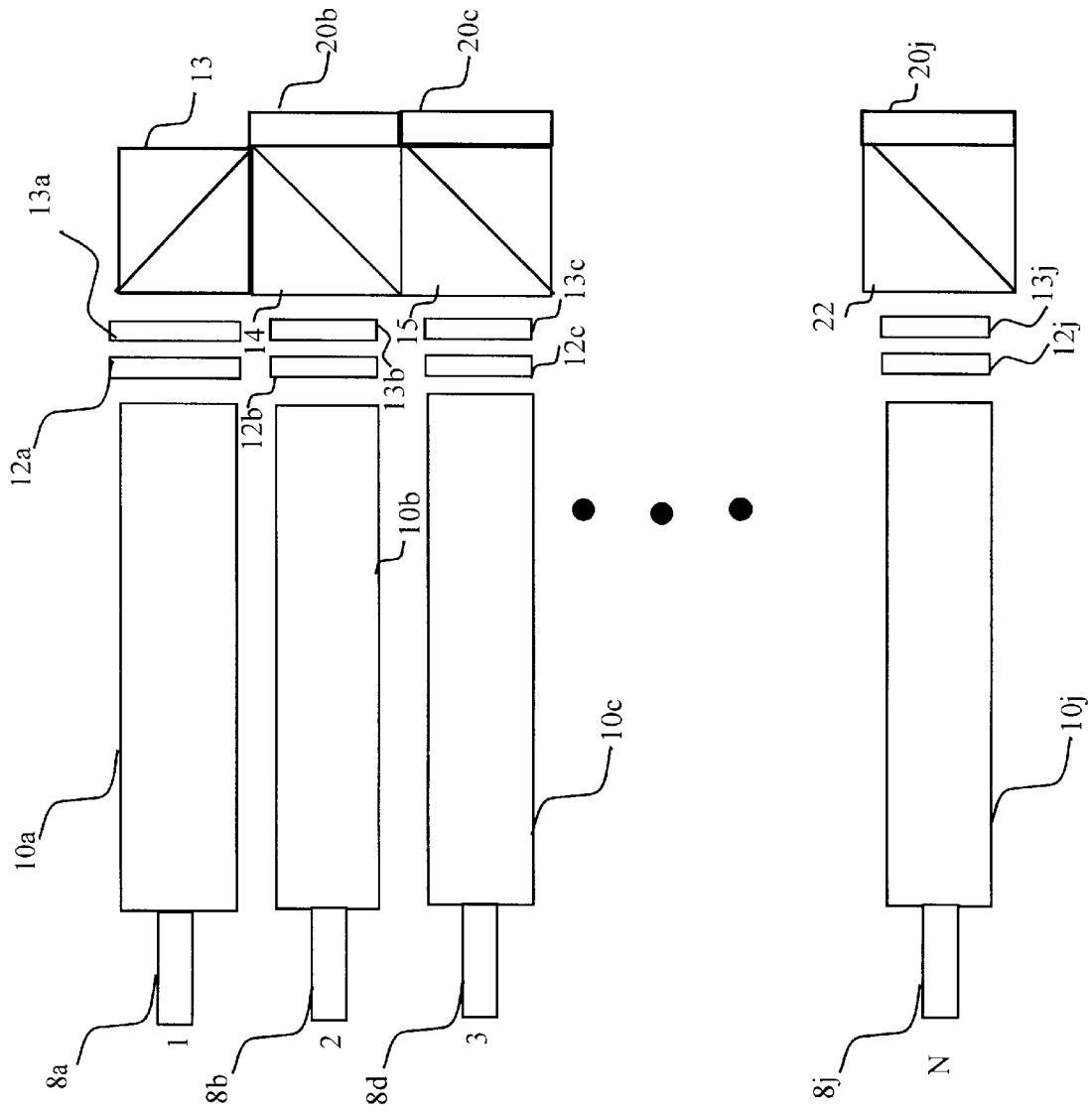

OPTICAL CIRCULATOR

This application is a continuation application of patent application Ser. No. 08/685,619 filed Jul. 24, 1996 now abandoned. This application is claiming Provisional Ser. No. 60/001,556, filed Jul. 27, 1995.

FIELD OF THE INVENTION

The present invention relates to an optical circulator for use in optical communications.

BACKGROUND OF THE INVENTION

A practical way to double the bit carrying capacity of an existing unidirectional fiber optic communication link is by the use of optical circulators. An optical circulator is a passive, non-reciprocal device which permits full duplex communication on a single fiber optic link. Thus, a typical fiber optic communication link operating on two fibers can be quickly and economically converted to a bi-directional, single fiber communication link by installing an optical circulator at each end of the link.

One of the major advantages of optical circulators over more traditional 3 dB couplers is that the loss penalty is much lower. Using a 3 dB coupler at each end of a fiber link, there is an insertion loss of at least 6 dB. For connections which operate near their detection limits, this additional 6 dB loss could make bi-directional communication impracticable.

In a real optical circulator insertion loss and cross-talk as well as simplicity and low cost are important considerations. Insertion loss is the difference in power between light launched into the optical circulator and the power that exits the device. Insertion loss is largely due to absorption of light and to coupling loss.

Prior art optical circulators are described in U.S. Pat. No. 4,650,289, issued to Kuwahara; U.S. Pat. No. 4,464,022, issued to Emkey; and in U.S. Pat. No. 4,859,014, issued to Schmitt et al. However, optical circulators made as described in these references either have high insertion loss and/or cross-talk, or are very complicated and costly. Therefore, a need exists for an optical circulator having lower insertion loss and cross-talk and simpler configuration than that found in present optical circulators.

One factor that contributes to lower insertion loss and cross-talk as well as simplicity in the optical circulator of the present invention than in prior optical circulators is the use of folded configuration with birefringent crystals and polarization spitting cubes.

A more recent prior art optical circulator that uses birefringent crystals in contact with other elements such as polarization rotators, is U.S. Pat. No. 5,204,771 issued Apr. 20, 1993 in the name of Koga. Although this invention appears to perform its intended function adequately, Koga's configuration results in a large device compared with the folded configuration of the present invention. Koga's configuration is limited in other ways. For example, there are limitations as to which ports can be circulated in a backwards direction. Koga's device allows backward control in a 4 port device however does not provide or allow backward signal propagation from port 3 to port 1 in a three port device.

Another still more recently issued U.S. Pat. No. 5,471,340 in the name of Cheng et al., issued Nov. 28, 1995 provides a simpler configuration than Koga. However, the cost of manufacturing this device is considerable due to the large size of the birefringent crystals required. Furthermore, this device is also limited in not being capable of performing a full circulating function.

It is therefore an object of the invention, to overcome many of the limitations of known prior art devices.

It is a further object of the invention to provide a compact optical circulator that is of a folded configuration.

SUMMARY OF THE INVENTION

In accordance with the invention, there is provided, a multi-port optical circulator for transmitting light from incoming and outgoing ports circularly comprising: dividing and combining means for dividing an input beam into two beams having orthogonal polarizations and for combining two beams having orthogonal polarizations into one beam; beam folding means for introducing a beam to a substantially opposite direction depending on the direction of the polarization of the beam comprising at least a means for substantially reflecting only one of s and p-polarizations of the beam; and polarization rotating means between said first dividing and combining means and said polarization dependent beam folding means for making two orthogonal polarization vectors parallel or the two parallel polarization vectors orthogonal to one another.

In accordance with another aspect of the invention, a multi-port optical circulator for transmitting light from incoming and outgoing ports circularly, comprising: first dividing and combining means for dividing a input beam into two beams having orthogonal polarizations and for combining two beams having orthogonal polarizations into one beam; second dividing and combining means for dividing a input beam into two beams having orthogonal polarizations and for combining two beams having orthogonal polarizations into one beam; polarization dependent beam folding means for introducing a beam to a substantially opposite direction depending on the direction of the polarization of the beam; first polarization rotating means disposed between said first dividing and combining means and said beam folding means for making two orthogonal polarization vectors parallel or the two parallel polarization vectors orthogonal to one another; and second polarization rotating means between said second dividing and combining means and said beam folding means for making two orthogonal polarization vectors parallel or the two parallel polarization vectors orthogonal to one another.

BRIEF DESCRIPTION OF THE DRAWINGS

Exemplary embodiments of the invention will now be described in conjunction with the drawings, in which:

FIGS. 3a and 3b are diagrammatic view similar to FIGS. 1a and 1b, however depicting the operation of the circulator shown in FIG. 3;

FIGS. 4, 5, and 6 are alternative embodiments of optical circulators in accordance with this invention; and, FIGS. 5a and 5b are diagrammatic views similar to FIGS. 1a and 1b, however depicting the operation of the circulator shown in FIG. 5.

FIGS. 5c and 5d show the input having different plane than the output port thereby the optical path length and minimizing polarization made dispersion.

DETAILED DESCRIPTION

Figure 1:
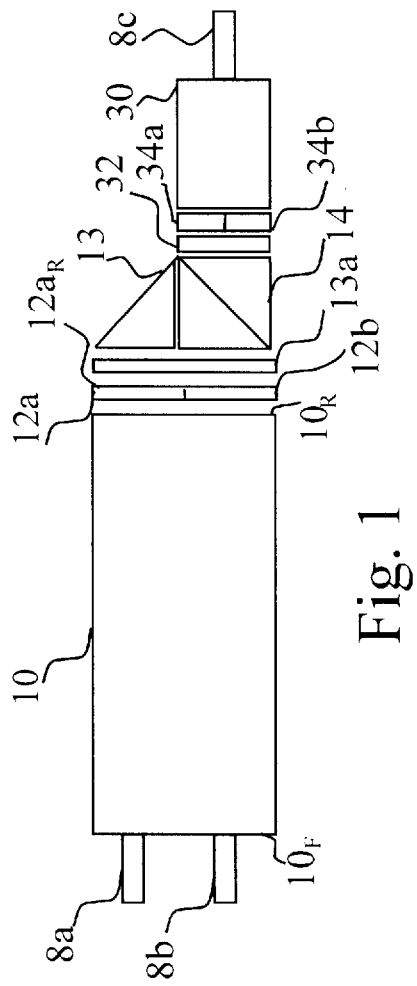
FIG. 1 is a schematic view an optical circulator in accordance with a first embodiment of the invention.
Figure 1A:
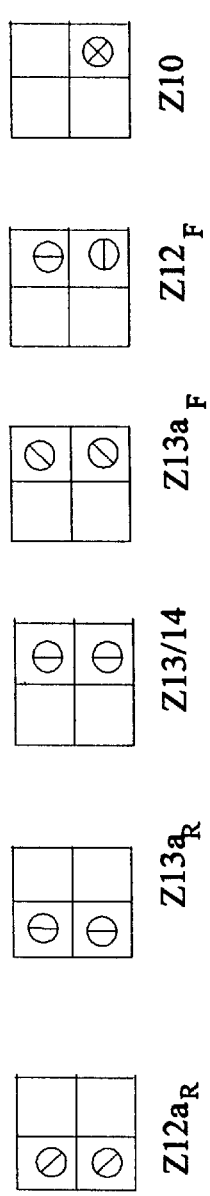
FIG. 1a is a diagrammatic view showing the light at different interfaces of the device of FIG. 1 from ports 1 to 2.
Figure 1B:
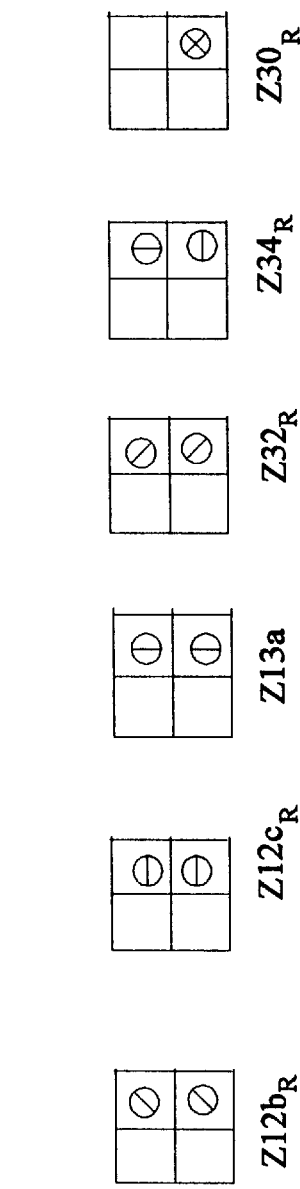
FIG. 1b is a diagrammatic view showing the light at different interfaces of the device of FIG. 1 from ports 2 to 3.

Referring now to FIG. 1a, an optical circulator is shown having first through third input/output ports 8a to 8c respectively. A birefringent crystal plate 10 is disposed between the first and second input/output ports 8a, 8b and non-reciprocal rotating means 13a in the form of Faraday rotating elements using Y.I.G crystal or Bi-added thin film crystals. The composition of the Bi-added thin film crystals include a combination of, for example, $(YbTbBi)_3Fe_5O_{12}$ and $(GdBi)_3(GeAlGa)_5O_{12}$, or of Y.I.G. and $Y_{3-x}Bi_xFe_5O_{12}$. Calcite, rutile or $YVO_4$ birefringent crystals are preferably used for the refraction crystal plate 10. Adjacent 10 is a reciprocal rotating means 12a and 12b in the form of a waveplate. Beam folding means in the form of a mirror or right angled prism 13 combined with a polarization beam splitter 14 is disposed between the third port and the rotating means 13a. The third port 8c is coupled to a birefringent crystal plate 30; non-reciprocal and reciprocal rotating means 32 and 34 are disposed between the plate 30 and the beam folding means 13 and 14.

Next, in operation, light entering the first port 8a is followed and explained as it enters and exits each optical element on its path to its destination second port 8b beginning at the side of the incoming and outgoing port 1. States Z10, Z12a, 12b, Z13, Z14 are indicated in FIG. 1a and coincide with end faces 10, through 14. Sub indices $_F$ and $_R$ are used to indicate the front and rear faces of the optical element shown in FIG. 1a. Light injected from the light incoming and outgoing port 1, is in a state $Z10_F$ and is separated into light L11 and light L12 by the first refraction crystal plate 10 and is in a state $Z10_R$. The electric field vibration of light L11 and light L12 which are perpendicular to each other, proceed in the same direction as a result of the light L11 and L12 passing through the reciprocal waveplate 12a. The state of the polarization at this time is shown by $Z12a_R$; L11 and L12 having been rotated 45 degrees by 13a. L11 and L12 at $Z13a_R$ are shown oriented vertically. The beam folding means 13 and 14 reverse the direction of the light L11 and L12 at Z13/14 maintaining their polarization states; Next rotators 12a and 12b at $Z13a_F$ and $Z12b_F$ respectively provide orthogonal beams to the birefringent crystal for combining shown by state $Z10_F$. A similar state of events follows when light is transmitted from port 2 to port 3 at 8b toward 8c, however the polarization beam splitter passes the horizontally polarized light (shown at state $Z13a_R$) through to rotators 32 and 34a, 34b in states Z32 and Z34 respectively to be combined by the birefringent crystal 30 at Z30.

Figure 1C:
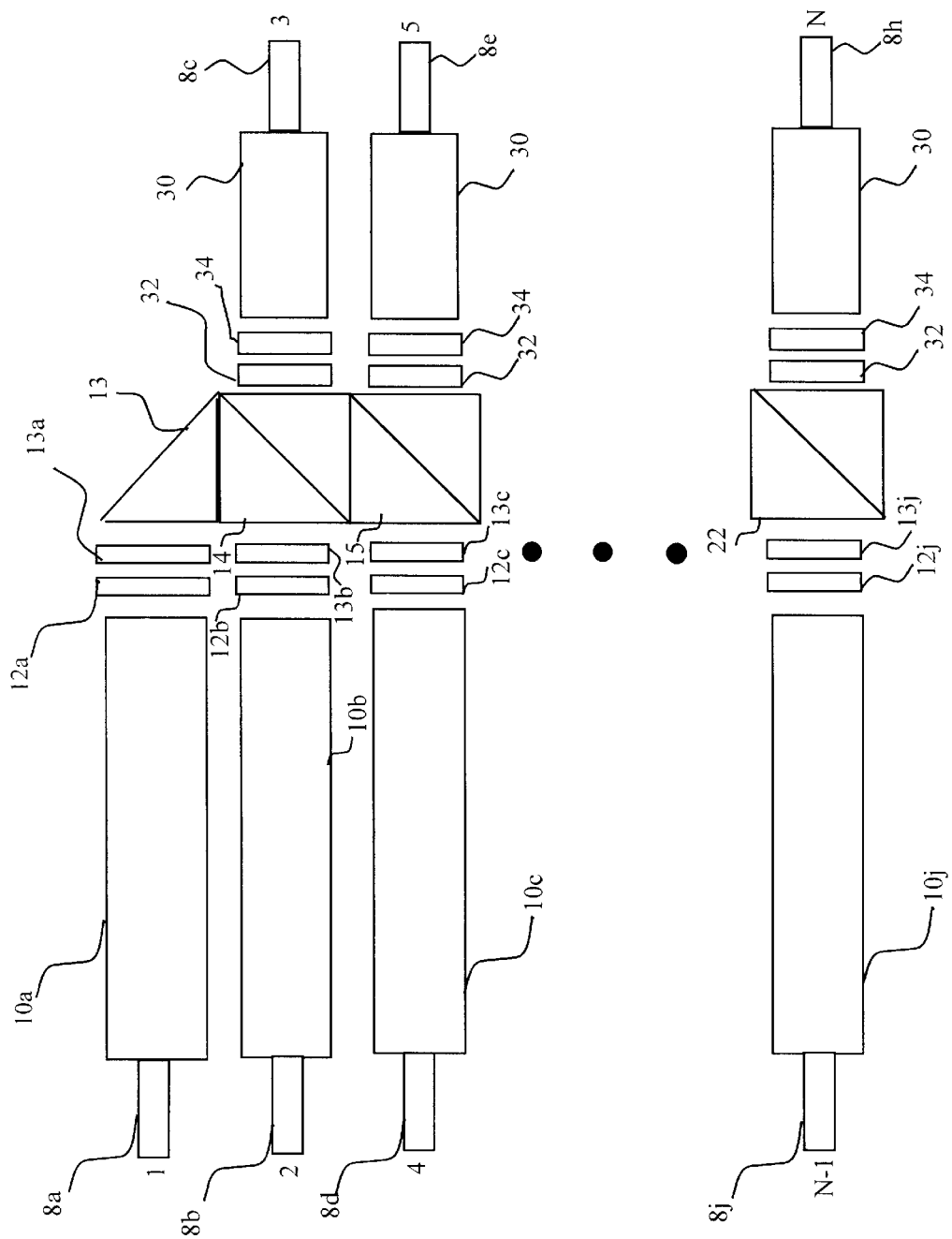
FIG. 1c is a schematic view of an alternative embodiment of an optical circulator.

Turning now to FIG. 1c an alternative arrangement is shown wherein smaller birefringent crystal plates 10a and 10b replace the single large birefringent plate 10 shown in FIG. 1a. Additional crystal plates 10c, 10d . . . 10j follow 10a and 10b and are juxtaposed next to one another providing an N port optical circulator. Conveniently, this obviates the requirement of providing large, expensive, birefringent crystals. Prisms 13, 15, 16, . . . 22 direct the light from each port to a next respectively. Adjacent the birefringent crystal plates 10a to 10j are reciprocal rotating means 12a to 12j in the form of waveplates. Non-reciprocal rotating means 13a to 13j are adjacent the rotating means 12a to 12j respectively.

Figure 1D:
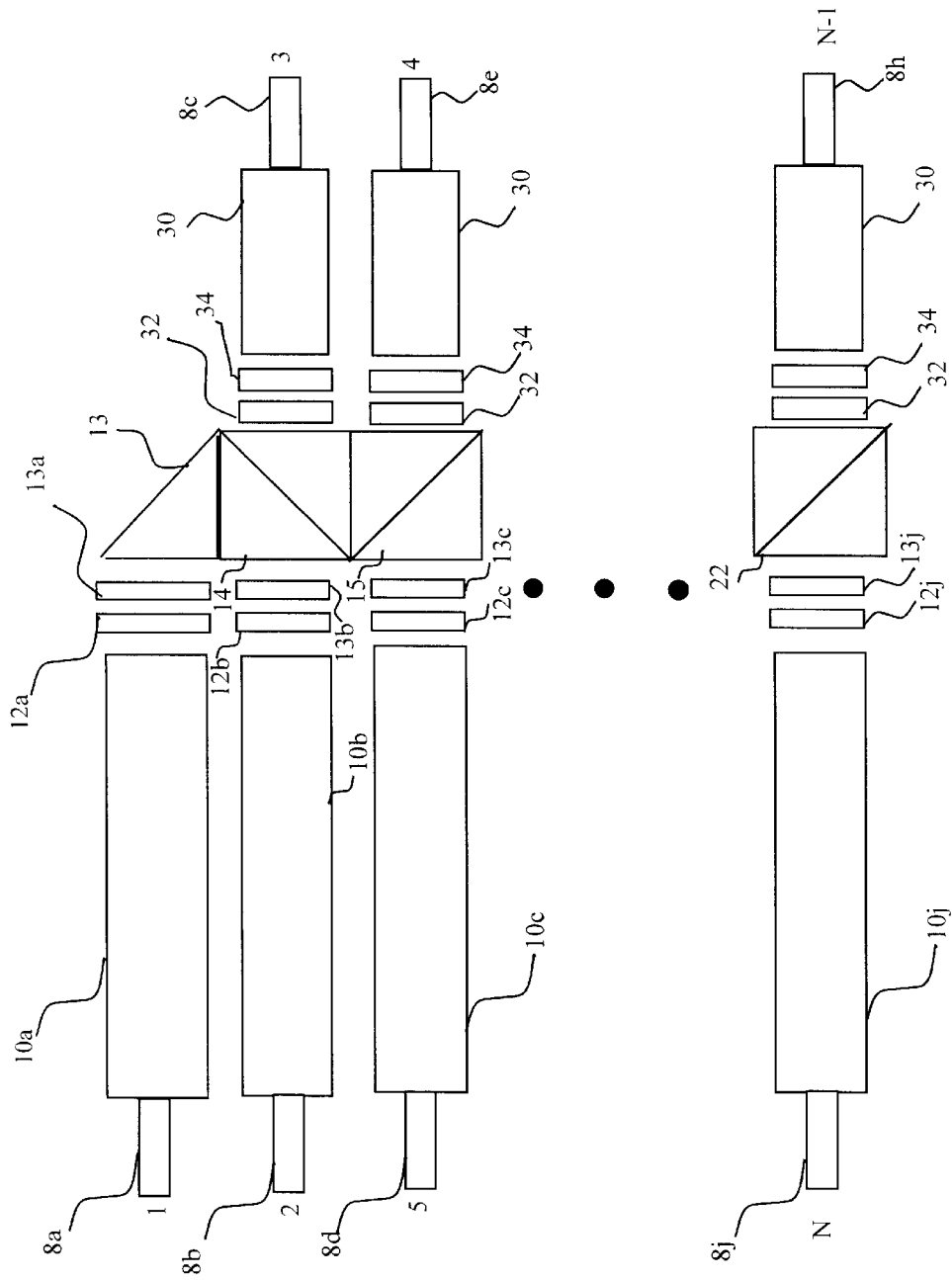
FIG. 1d is a schematic view of an alternative embodiment of an optical circulator similar to the one shown in FIG. 1c, wherein the crystal is turn around at each alternative group of ports.

FIG. 1d shows yet an alternative embodiment wherein the orientation of the beam folding means 13 and 14 in the form of prisms are oriented differently than those of FIG. 1a. In this arrangement, ports 1, 2, 5, 7 are on a first side of the device wherein in FIG. 1c, ports 1, 2, 4, are on a first side of the device shown.

Referring now to FIGS. 2, 3, 4, 5 and 6, alternative embodiments of the invention are shown having completely folded configurations. By using a folded configuration the number of elements required to manufacture the device are reduced and thus, the cost of making the device is substantially reduced. Furthermore and conveniently, all of the ports are disposed on a single side of the device.

Figure 3:
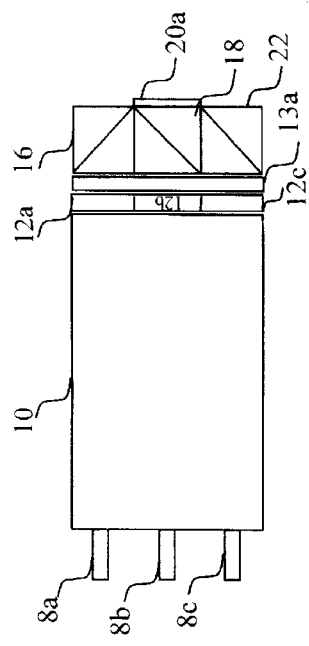
FIGS. 2, and 3, are schematic views of an alternative embodiments of optical circulators in accordance with the invention.
Figure 2:
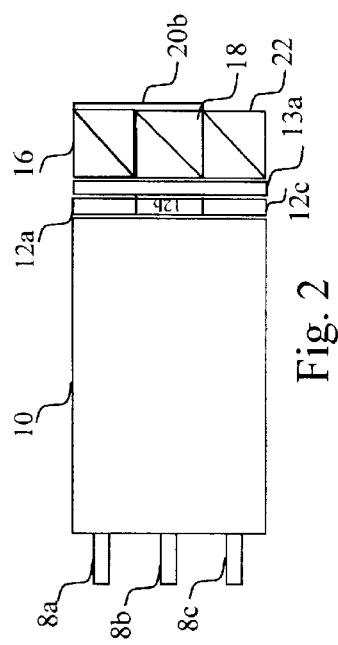

The optical circulators of FIGS. 2 and 3 are shown having first through third input/output ports 8a to 8c respectively. A birefringent crystal plate 10 is disposed between the first and second input/output ports 8a, 8b. Light traveling from 8a to 8b passed through the plate 10 and enters a reciprocal rotating means 12a in the form of a waveplate. The light then enters a non-reciprocal rotator 13a and then passes to a polarization beam splitter 16 and then to a second beam splitter 20. These two beamsplitters 16 and 18 function as means for folding the beams and introducing them to a substantially opposite direction toward the second port. The beams then pass through 13a and a second rotator 12b to be combined by the birefringent crystal plate 10 at the second port 8b. Light traveling from the second port 8b to the third port 8c travels in a similar manner, however, a 90 degree rotating mirror 20a in FIG. 3 and 20b in FIG. 2 is provided at an end face of the beamsplitter 18 to direct the polarized lights to a third beamsplitter 22. In combination, 18, 20a, and 22 serve to fold the beams and direct them oppositely from the second port 8b toward the third port 8c. The beams then pass though 14, and a third rotator 12c to be combined by the plate 10 at the port 8c.

Next, with reference to the device of FIG. 3 and FIGS. 3a and 3b, in operation, light entering the first port 8a is followed and explained as it enters and exits each optical element on its path to its destination second port 8b beginning at the side of the incoming and outgoing port 1. States Z10, Z12a, 12b, Z13a, Z16 and Z18 are indicated in FIG. 3 and coincide with end faces 10, through 18. Sub indices $_F$ and $_R$ are used to indicate the front and rear faces of the optical element shown in FIG. 2. Light injected from the light incoming and outgoing port 1, is in a state $Z10_F$ and is separated into light L11 and light L12 by the first refraction crystal plate 10 and is in a state $Z10_R$. The electric field vibration of light L11 and light L12 which are perpendicular to each other, proceed in the same direction as a result of the light L11 and L12 passing through the reciprocal waveplate 12a. The state of the polarization at this time is shown by $Z12a_R$; L11 and L12 having been rotated 45 degrees by 13a. L11 and L12 at $Z13a_R$ are shown oriented vertically. The beam folding means 16 and 18 reverse the direction of the light L11 and L12 at Z16/18 maintaining their polarization states; Next rotators 13a and 12b at $Z13a_F$ and $Z12b_F$ respectively provide orthogonal beams to the birefringent crystal for combining shown by state $Z10_F$. A similar state of events follows when light is transmitted from port 2 to port 3 at 8b toward 8c, however the polarization beam splitter 18 passes the horizontally polarized light through to the mirror 20a or 20b (FIG. 3, FIG. 2 respectively) L11 and L12 is reflected back to port 3 at 8c following a path through beamsplitter 22, rotators 13a and 12c, and being combined by 10.

Of course, the devices shown in FIGS. 2 and 3 may have multiple other ports folded in a similar manner as are ports 1, 2 and 3, therefore a fourth port can be provided under the third one, and so on. Various other embodiments that function in substantially the same manner as those shown in FIGS. 2 and 3 can be seen by viewing FIGS. 4 and 5. With reference to FIG. 4, the two beamsplitters adjacent ports one and 3 shown in FIGS. 2 and 3, have been replaced by mirrors or right angled prisms. By doing this a full 3 port circulator is provided where light launched into port 3 circulates back to port 1. In FIG. 5, the device is shown having a greater number of optical elements. For example, instead of using a single crystal plate 10, three plates, 10a, 10b, and 10c are utilized. Unlike FIGS. 3a and 3b, in FIGS. 5c and 5d the input port is in a different plane than the output port thereby balancing the optical path length and subsequently minimizing polarization mode dispersion. Turning now to FIG. 5a, an alternative embodiment is shown, similar to FIG. 5, however having only a singe Faraday rotator 13b providing a single stage circulator providing less isolation than the circulator of FIG. 5a. FIG. 5b shows yet an alternative embodiment of the invention shown if FIG. 5, wherein a different arrangement of beam spitting means 16a to 16d are provided.

In FIG. 6, an alternative arrangement of an N-port folded optical circulator is shown based upon the embodiment of FIG. 5., wherein all of the N ports are disposed on the same side of the device. Of course in this embodiment reflective surfaces 20a to 20$_{N-1}$ in the form of mirrors in combination with the prisms 16, 18, 22, . . . N serve as folding means for the device.

Various embodiments of the circulators described in accordance with this invention provide numerous advantages over the prior art. They are less expensive to build than many prior art circulators requiring fewer costly components.

Numerous other embodiments may be envisaged without departing from the spirit and scope of the invention.

What I claim is:

1. A multi-port optical circulator for transmitting light from incoming and outgoing ports circularly comprising:
    dividing and combining means for dividing an input beam into two beams having orthogonal polarizations and for combining two beams having orthogonal polarizations into one beam;
    beam folding means; and
    polarization rotating means between said dividing and combining means and said beam folding means for making two orthogonal polarization vectors parallel or the two parallel polarization vectors orthogonal to one another, characterized in that the beam folding means is optically coupled to receive the two beams propagating in a first direction from an incoming port and for directing the two beams in a substantially opposite direction to the first direction to an outgoing port depending on the direction of the polarization of the beams, comprising at least means for substantially reflecting only one of the s and p-polarizations of the beam.

2. A multi-port optical circulator as defined in claim 1, wherein the beam folding means includes a polarization dependent at least partial reflector.

3. A multi-port optical circulator for transmitting light from incoming and outgoing ports circularly, comprising:
    first dividing and combining means for dividing a input beam into two beams having orthogonal polarizations and for combining two beams having orthogonal polarizations into one beam;
    second dividing and combining means for dividing a input beam into two beams having orthogonal polarizations and for combining two beams having orthogonal polarizations into one beam;
    beam folding means for introducing a beam to a substantially opposite direction depending on the direction of the polarization of the beam;
    first polarization rotating means disposed between said first dividing and combining means and said beam folding means for making two orthogonal polarization vectors parallel or the two parallel polarization vectors orthogonal to one another; and
    second polarization rotating means between said second dividing and combining means and said beam folding means for making two orthogonal polarization vectors parallel or the two parallel polarization vectors orthogonal to one another, wherein the first dividing and combining means comprises a birefringent crystal plate.

4. A multi-port optical circulator for transmitting light as defined in claim 3, wherein the beam folding means comprises at least a polarization dependent partial reflector.

5. A multi-port optical circulator as defined in claim 1, wherein the dividing and combining means for dividing an input beam into two beams having orthogonal polarizations and for combining two beams having orthogonal polarizations into one beam comprises a birefringent crystal plate.

6. A multi-port optical circulator as defined in claim 1, wherein the dividing and combining means for dividing an input beam into two beams having orthogonal polarizations and for combining two beams having orthogonal polarizations into one beam comprises a plurality of birefringent crystal plates disposed adjacent to one another.

7. A multi-port optical circulator as defined in claim 6, including reflective means for providing a folded configuration such that all ports are disposed adjacent said beam folding means, said reflective means being adjacent to said beam folding means.

8. A multi-port optical circulator as defined in claim 1, wherein the polarization rotating means comprises a reciprocal rotating means and a non-reciprocal rotating means disposed between the dividing and combining means and the beam folding means.

9. A multi-port optical circulator comprising a plurality of adjacently stacked modules, each module providing one of the multi-ports, each module comprising
    dividing and combining means for dividing a input beam into two beams having orthogonal polarizations and for combining two beams having orthogonal polarizations into one beam;
    beam folding means and polarization rotating means between said dividing and combining means and said beam folding means for making two orthogonal polarization vectors orthogonal to one another, characterized in that the beam folding means is polarization dependent for introducing a beam incident thereon in a first direction to a substantially opposite direction to the first direction depending on the direction of the polarization of the beam, comprising at least a means for substantially reflecting only one of s and p-polarizations of the beam.

10. The device as defined in claim 9, wherein all of the multi-ports are disposed on a same side of the device.

11. The device as defined in claim 9, wherein the circulator includes at least a reciprocal and non-reciprocal rotating means disposed between the dividing and combining means and the beam folding means.

* * * * *